F. SELLENSCHEIDT.
FILTER.
APPLICATION FILED SEPT. 28, 1908.

No. 927,606.

Patented July 13, 1909.

UNITED STATES PATENT OFFICE.

FREDERIC SELLENSCHEIDT, OF MILWAUKEE, WISCONSIN.

FILTER.

No. 927,606.

Specification of Letters Patent.

Patented July 13, 1909.

Application filed September 28, 1908. Serial No. 455,157.

*To all whom it may concern:*

Be it known that I, FREDERIC SELLENSCHEIDT, a citizen of the United States, residing at Milwaukee, in the county of Milwaukee and State of Wisconsin, have invented a new and useful Filter, of which the following is a specification.

My invention relates to improvements in filters, with especial reference to that class of filters employed for beer, wine and other liquors.

The object of my invention is to provide means for varying the filterage by varying the density of the filtering material in accordance with the requirements of the liquid during filtration.

A further object of my invention is to provide improved structural features in a filter of the described class.

In the following description, reference is had to the accompanying drawings, in which—

Figure 1:
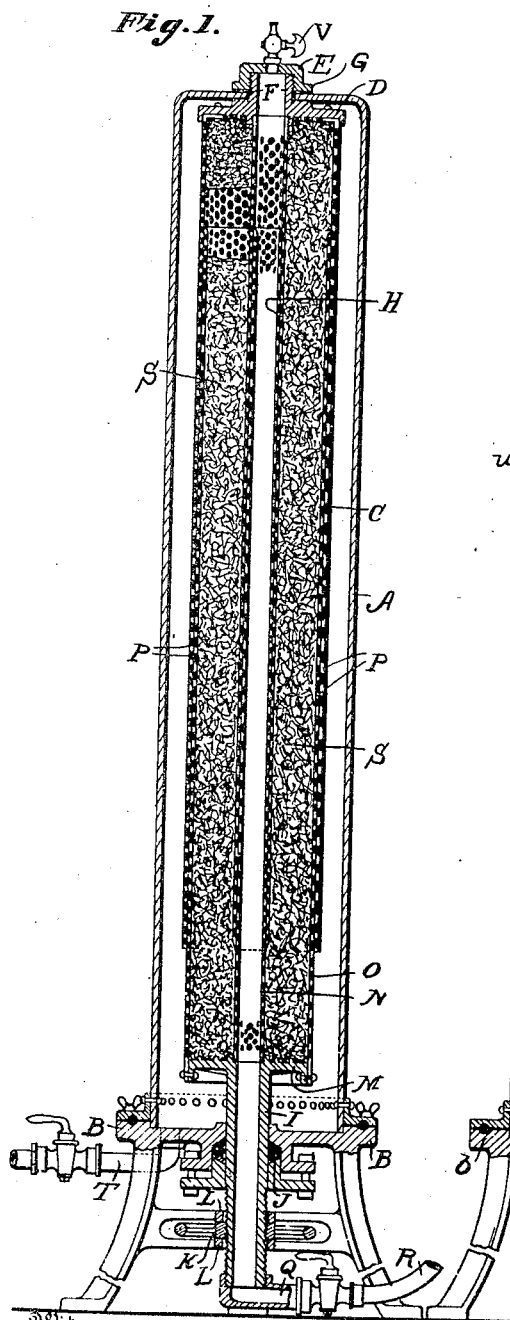
Figure 2:
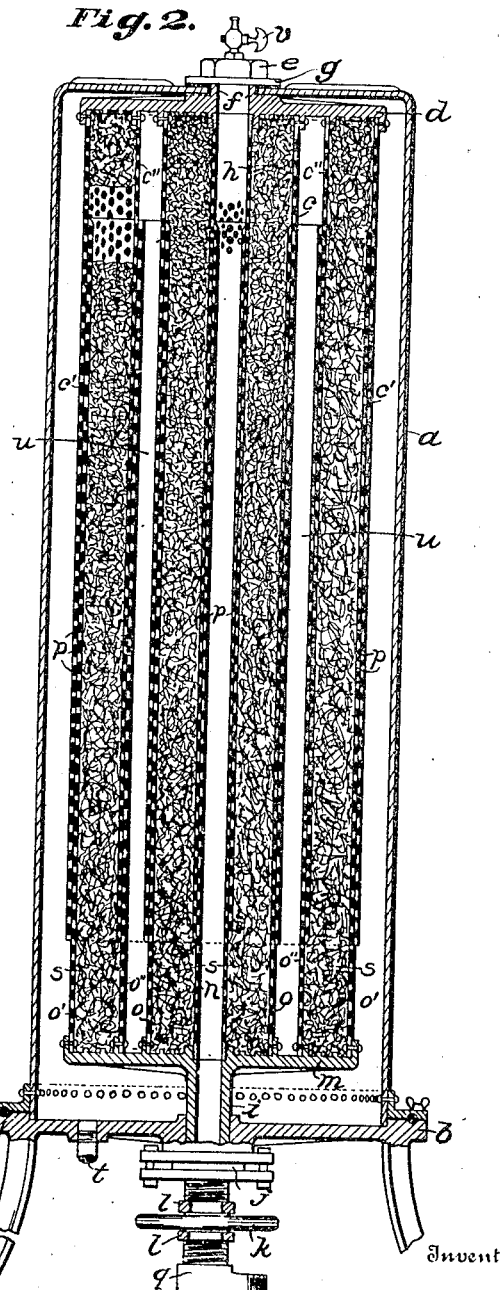

Figure 1 is a vertical sectional view of a filter embodying my invention. Fig. 2 is a similar view showing a more complex structure.

Like parts are identified by the same reference characters throughout both views.

An imperforate casing A, (Fig. 1) is mounted upon a base B, and a screen C, preferably cylindrical in form and having an open lower end, is suspended from the upper end of the casing A, to which it is connected by the coupling members D and E, the member D being rigidly secured to the upper end of the screen C to form a head or end piece, which is provided with a tubular screw threaded central portion F, extending through the end wall of the outer casing. The member E constitutes an exterior cap nut, screwed to the projecting end of the portion F, with a base flange G engaging the end wall of casing A between it and a portion of the head D. A perforate tube H is connected with the tubular portion F and suspended therefrom within the screen C.

A tubular standard I extends through the base B, with packing at J to prevent the escape of liquid from within casing A. The standard I is vertically adjustable and is adjusted by means of a nut K operating between the frame members L, as shown. The upper end of the standard I, is provided with a disk M which supports a tube N, continuous with the tubular standard, and a screen O which telescopes upon the screen C, these screens being preferably cylindrical and arranged to fit with substantial exactness, one within the other. The tube N similarly fits the tube H. These tubes H, N, and screens C, O, are preferably formed of sheet metal provided with perforations P, whereby the liquid from the outer portions of casing A is permitted to pass through to the tube N and downwardly through the standard I and through a valved passage Q to a delivery pipe R.

The space between the screens C, O, and tubes H, N, is filled with filtering material S, preferably with material which can be easily compressed, and which will expand when the compression is relieved, wood fiber or pulp being suitable for the purpose.

In operation, the liquid to be filtered, is delivered under pressure to the casing A through a pipe T, and this liquid passes through the screens C and O, the filtering material and the perforated tubes H and N to the interior of the tube N, and then downwardly through the standard I as above explained. By raising the standard, the filtering material is compressed and the filtering operation retarded. The standard may be raised or lowered by means of the nut K which has threaded engagement with the standard and when turned, bears on a frame member L and actuates the standard to raise or lower the screens N and O and thus lengthen and shorten the space occupied by the filtering material. By lowering the standard, the filtering material is permitted to expand and the operation accelerated. The tube H being stationary, and the opposing screen O being movable with the standard, it is obvious that when the standard is lowered, the relative movement of these two walls will facilitate the expansion of the material S.

The cap nut E is provided with a valve V to permit the escape of air when the liquid is first admitted to casing A.

Referring to Fig. 2, the same reference characters are employed except that small letters are used instead of capitals, to identify the corresponding parts. This filter is, however, of larger diameter and is provided with additional walls $c'$, $o'$, and $c''$, $o''$, arranged respectively to telescope upon each other, with a space $u$ between these telescoping sets of walls, which serves as an intermediate reservoir, the liquid being subjected to a double filtering operation. It will therefore be understood that the number of walls and columns of filtering material may be increased or diminished to meet any requirements. It will be observed that the perforations in the respective walls are staggered, so that the capacity of the openings will not be materially varied when the adjustment of the standard is changed.

The filtering material S is preferably inserted in the space between the perforate tube H and the screen C to loosely fill such space, and another body of like filtering material is inserted in the space between the perforate tube N and the cylindrical screen O, preparatory to assembling the parts, so that when assembled, the telescoping movement of the tubes and screens, will compress the respective bodies of filtering material S to the desired density.

Having thus described my invention, what I claim as new, and desire to secure by Letters Patent is,—

1. A filter, comprising an inclosing casing, provided with a set of depending interior perforate walls, a tubular standard extending upwardly through the bottom wall of the casing and vertically adjustable therein, a set of perforate walls connected with said standard and telescopically arranged in relation to said depending walls, and a body of filtering material between the inner and outer telescopically over-lapping walls, said casing being provided with an inlet communicating with space between the casing and the outer perforated walls and said tubular standard constituting an outlet.

2. A filter, comprising an inclosing casing, provided with a set of depending interior perforate walls, a tubular standard extending upwardly through the bottom wall of the casing, a set of perforate walls, connected with said standard and arranged to lap over said depending walls, and a body of filtering material between the over-lapping walls, said casing being provided with an inlet communicating with space between the casing and the outer perforated walls and said tubular standard constituting an outlet.

3. A filter, comprising an inclosing casing, provided with a set of depending interior perforate walls, a tubular standard extending upwardly through the bottom wall of the casing, a set of perforate walls, connected with said standard and arranged to lap over said depending walls, and a body of filtering material between the over-lapping walls, together with means for varying the density of the filtering material, said casing being provided with an inlet communicating with space between the casing and the outer perforated walls and said tubular standard constituting an outlet.

4. A filter, comprising an inclosing casing, provided with a set of depending interior perforate walls and a body of filtering material located between said walls, a tubular standard extending upwardly through the bottom wall of the casing, a set of perforate walls connected with said standard and arranged to lap over said depending walls, and a body of filtering material between the walls carried by said standard in compressing relation to the filtering material between said depending walls, said casing being provided with an inlet communicating with space between the casing and the outer perforated walls and said tubular standard constituting an outlet.

5. A filter comprising an inclosing casing provided with a set of interior longitudinally extending walls connected with the casing, a set of longitudinally extending movable walls telescopically arranged to lap over the walls of the first mentioned set, a body of filtering material located between the overlapping walls and means for adjusting said movable walls to compress the filtering material or permit it to expand,— said walls being provided with perforations and said casing being provided with an inlet leading to space exterior to the overlapping walls, and an outlet leading from the central portion of the chamber inclosed by said casing.

6. A filter comprising sets of telescopically arranged perforated walls, means for adjusting one set of said walls relatively to the other, a body of filtering material located between the walls, and a casing inclosing said walls and provided with an inlet passage leading to space exterior to said walls, and an outlet passage leading from the central space within said walls.

In testimony whereof I affix my signature in the presence of two witnesses.

FREDERIC SELLENSCHEIDT.

Witnesses:
F. A. OTTO,
MARY COLLINGE.